United States Patent [19]

Inglee

[11] 4,099,375
[45] Jul. 11, 1978

[54] EXHAUST PLUME REDUCTION AND COOLING SYSTEM

[75] Inventor: Clinton F. Inglee, Media, Pa.

[73] Assignee: The United States of America as represented by the Secretary of the Navy, Washington, D.C.

[21] Appl. No.: 765,500

[22] Filed: Feb. 3, 1977

[51] Int. Cl.² .............................................. F02C 7/18
[52] U.S. Cl. .................................... 60/39.5; 60/39.66
[58] Field of Search ................ 60/39.5, 264, 262, 269, 60/266, 39.66; 239/127.1, 127.3, 265.17

[56] References Cited

U.S. PATENT DOCUMENTS

| | | | |
|---|---|---|---|
| 2,434,134 | 1/1948 | Whittle | 60/39.66 |
| 3,034,298 | 5/1962 | White | 60/39.66 |
| 3,210,934 | 10/1965 | Smale | 60/39.5 |
| 3,289,413 | 12/1966 | Gist | 60/262 |
| 3,348,379 | 10/1967 | Wilde et al. | 60/262 |
| 3,970,252 | 7/1976 | Smale et al. | 60/264 |
| 3,981,143 | 9/1976 | Ross et al. | 60/39.5 |
| 4,007,587 | 2/1977 | Bathin et al. | 60/39.5 |
| 4,018,046 | 4/1977 | Hurley | 60/39.5 |

Primary Examiner—Robert E. Garrett
Attorney, Agent, or Firm—R. S. Sciascia; L. I. Shrago; C. E. Vautrain, Jr.

[57] ABSTRACT

A radiation suppressor for exhaust turbine or other engines which significantly reduces the lock-on range of infrared seeking missiles is provided. Engine exhaust gases are the sole power source for driving an exhaust turbine which includes a self-contained turbo-fan assembly and a surrounding plenum-shroud assembly both of which are structurally supported by the aircraft or other vehicle-cooling air duct assembly. The turbo-fan assembly comprises a turbine wheel having a top or outer fan for providing both hot metal and plume cooling air and a central centrifugal blower to partially cool the hollow turbine blades. The duct assembly is combined with ambient air passages to distribute plume cooling air, while a plenum-shroud assembly which surrounds these assemblies includes internally cooled radial vanes disposed in a turbine shroud as well as an outer fairing having flow passages for cooling air.

6 Claims, 6 Drawing Figures

EXHAUST PLUME REDUCTION AND COOLING SYSTEM

The present invention concerns an infrared suppressor for reducing the lock-on range of infrared seeking missiles and, more particularly, a self-contained suppressor system that may be removed in its entirety when not required.

In order to protect gas turbine driven aircraft or other vehicles from detection and lock-on by infrared seeking missiles, a variety of suppressant devices have been produced which both block a direct view of the gases from the missile and divert engine exhaust gases through passages so as to mix the gases with cooler air before they are discharged. The prior devices derive motive power from other aircraft power systems, thereby reducing efficiency and increasing maintenance time and expense. The present invention, in contrast, uses only the exhaust gas to drive a turbine fan which produces flow of cooling air through several areas of a shroud assembly.

Accordingly, it is an object of the present invention to provide an exhaust turbine suppressor wherein the power to distribute cooling air is derived solely from the craft engine exhaust gas.

Another object of this invention is to provide an exhaust turbine suppressor having a combined self-lubricated turbine and shroud assembly which may be removed when not required.

A further object of this invention is to provide an exhaust turbine suppressor which features increased engine and cooling efficiency, reduced weight, and ease of removal for maintenance and repair.

Other objects, advantages and novel features of the invention will become apparent from the following detailed description thereof when considered in conjunction with the accompanying drawings wherein like numerals represent like parts throughout and wherein.

The present invention, in general, concerns a composite, self-contained, easily removable exhaust turbine suppressor having a set of assemblies for shielding exhaust gases and overheated metallic components, and reducing exhaust gas temperatures. The assemblies include a turbine/vane assembly for powering the system, a duct/vane assembly for supporting the composite assemblies and initially distributing hot exhaust gases, and a plenum/shroud assembly for effectively mixing hot exhaust gases with cooling air. In the turbine/vane assembly, exhaust gases are directed against hollow turbine blades which are disposed intermediate a central blower arrangement and sets of outer vanes and tip fan blades. The duct/vane assembly is supported by the aircraft structure and includes outer and inner exhaust ducts and inlet guide vanes for distributing hot exhaust gases. The plenum/shroud assembly includes a turbine shroud and a fairing which provides major and minor passages for mixing the gases and air. Both ambient cooling air and engine compartment cooling air are utilized in the suppressor, with inlet guide vanes and outer disposed radial vanes plus intermediate auxiliary passages providing a flow combination which effectively mixes cooling air and exhaust gases as well as physically blocking the hot metal from detection by an infrared seeking missile.

Figure 1:
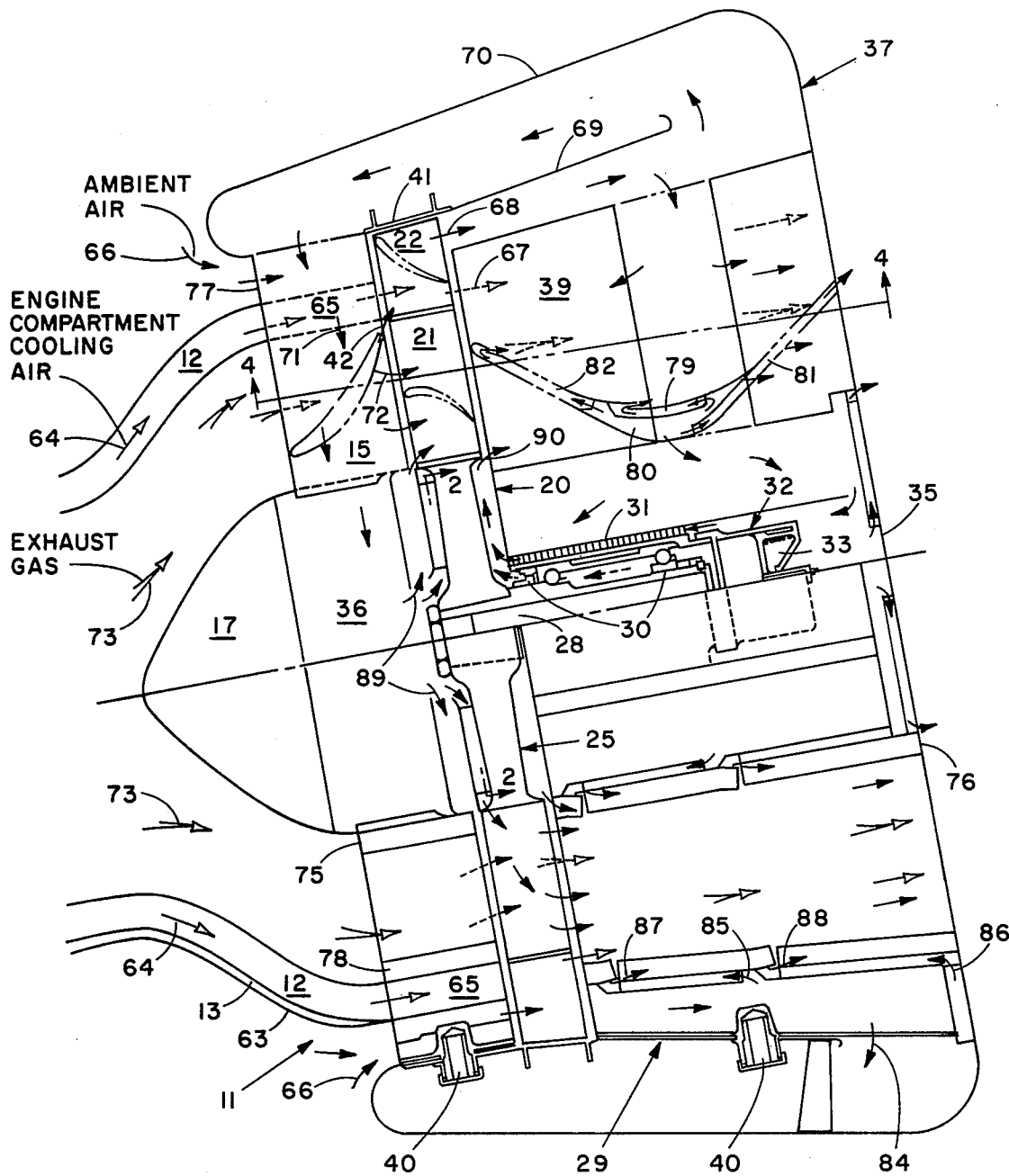
FIG. 1 is a sectional view of the suppressor of the present invention mounted on the aft end of an aircraft turbine engine.
Figure 2:
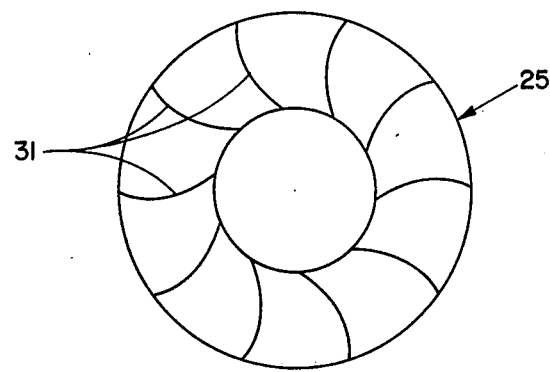
FIG. 2 is an end view of the interior turbine blades only of the embodiment of FIG. 1.
Figure 3:
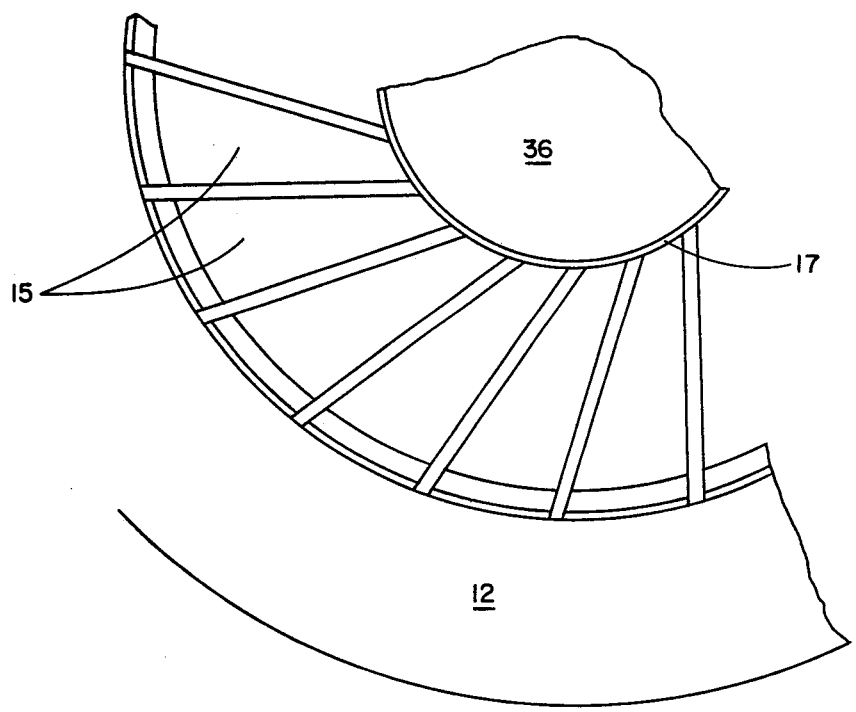
FIG. 3 is an end view of the shroud assembly.
Figure 4:
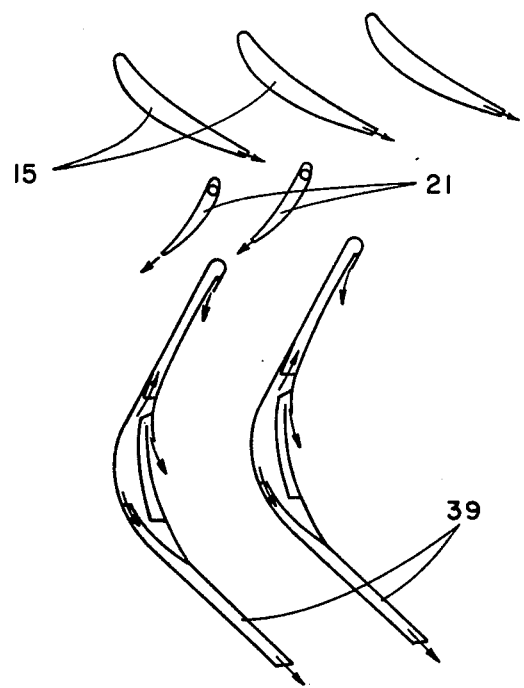
FIG. 4 is an expanded sectional view of the outer series of vanes and blades taken along a line substantially corresponding to line 4—4 in FIG. 1.

Referring to the drawings, FIG. 1. illustrates most of the components of the invention and include a duct/vane assembly 11 comprising an inner exhaust duct 12, an outer support and exhaust duct 13, a plurality of inlet guide vanes 15 some of which support an inner streamlined body 17. A turbine/fan assembly 20 including a turbine wheel 21, a tip fan 22 and an internal centrifugal blower 25 is mounted on the periphery of duct 13. A shaft 28 is supported by a rear nozzle structure 29 and support bearings 30. FIG. 2 shows the arrangement of a plurality of vanes 31 in centrifugal blower 25. A self-contained lubrication system 32 for turbine support bearings 30 is provided and includes a lubricant reservoir 33 which is easily checked and refilled by removing a cover 35 which will be described in connection with the remaining assembly, a plenum/shroud assembly 37. Included in assembly 37 are a plurality of cooled radial vanes 39 some of which support turbine bearings 30 and all of which combine to hide the outer upstream hot metal of the turbine and its components. Cover 35 shields the centrally disposed components of the turbine suppressor. FIG 3 is an end view of the suppressor from a position upstream of the turbine wheel and shows a plenum 36 in body 17, radial vanes 15 and duct 12 while FIG. 4 is an expanded section of the composite assembly taken along a line substantially corresponding to line 4—4 in FIG. 1. Radial vanes 39 are cooled by the interior passages therein shown in FIG. 4 which figure also shows the alignment of the series of vanes and turbine blades in the path of exiting exhaust gases about body 17. Turbine/fan assembly 20 is attached to plenum/shroud assembly 37 by a plurality of support pins 40 which pins also attach the plenum/shroud to duct/vane assembly 11. A flanged circumferential band 41 is disposed about the periphery of tip fan 22 to maintain the required clearance and structural integrity of the suppressor in this area. Hollow stationary guide vanes 15 are inserted for the dual purposes of diverting cooling air inward to the centerbody 17 as well as out the trailing edge of the vanes as indicated at 42 to both reduce plume temperatures and direct the gas to turbine blades 21 at the proper angle and distribution.

Figure 5:
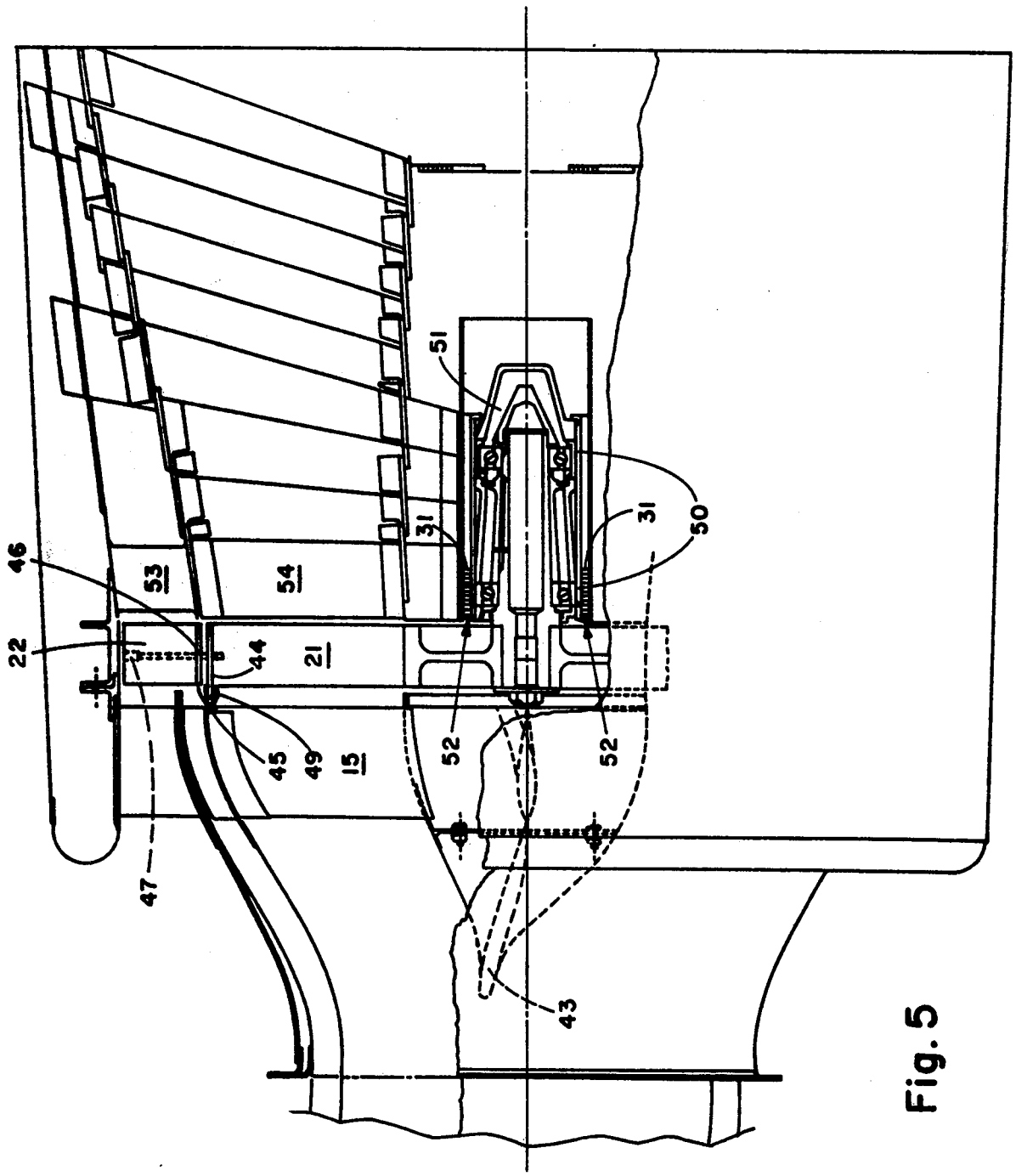
FIG. 5 is a front elevation partly cut away of an alternate embodiment of the invention.

FIG. 5 illustrates an alternate cooling arrangement wherein a turning vane 43 has been added to more uniformly distribute the exhaust gas to guide vanes 15. A steel turbine shroud 44 is inserted to preclude the transfer of heat from turbine blades 21 to compressor blades 22, and an air space 45 is provided between shroud 44 and blades 22 which are mounted on a shroud 46. Pins 47 are installed in each compressor blade 22 and turbine blade 21 to provide the compressor drive. A labyrinth seal 49 protects against any extension of turbine shroud 44. Each of two bearings 50 are provided with individual self-contained lubrication systems in which grease is pumped by a ramp 51 that has a special surface finish so that no service is required for the lift of the unit. The bearing assembly is cooled by air indicated at 52 passing over cooling fins 31. A plurality of diffuser vanes 53 are added to diffuse the cooling air and permit its flow into the leading or upstream portion of vanes 54.

Figure 6:
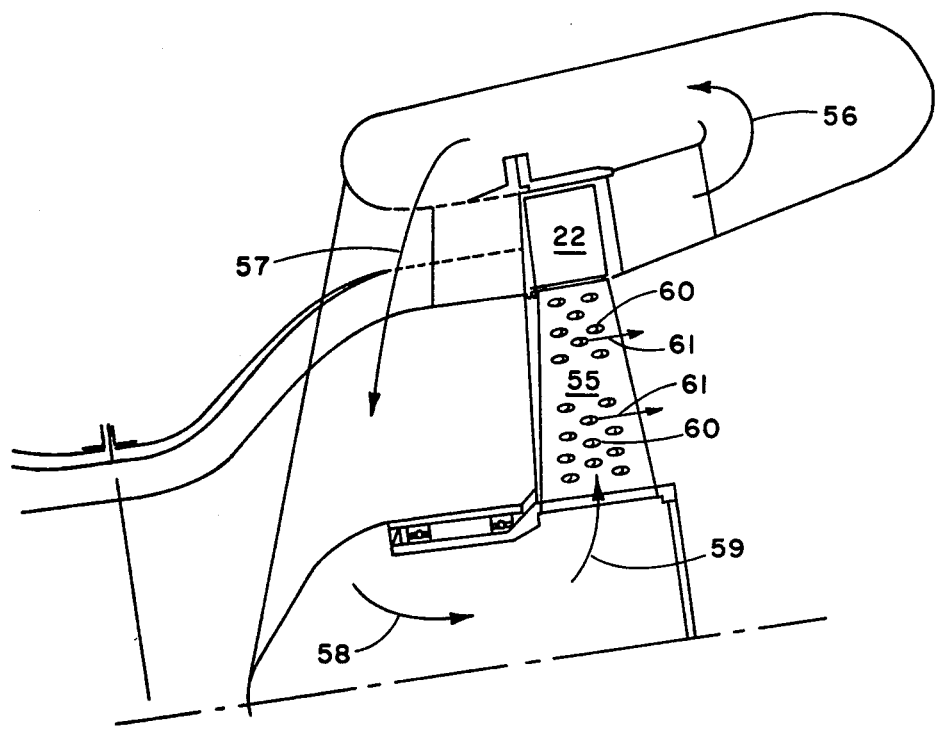
FIG. 6 is a schematic illustration of a further embodiment of the invention.

An alternate configuration is presented in FIG. 6 for eliminating the radial or hiding vanes 39 and thereby reducing the weight and cost of the unit. In this configuration, cooling is effected by film-cooling a plurality of hollow turbine vanes 55 to the required temperature via pumping a large quantity of cooling air by means of vanes 22 as indicated by arrows 56-59 into vanes 55. This cooling air exits vanes 55 through a multiplicity small slots 60 therein preferably canted rearward so as to release cooling air in the direction indicated by arrows 61.

In operation, the periphery of exhaust duct 13 provides the structural support for all of the components of the suppressor and further shields the hot metal at 63. Engine compartment cooling air, which is indicated by arrows 64, bypasses the support vanes as indicated at 65 and is delivered directly into the blades of tip fan 22. The tip fan is an integral part of the self-contained turbine in the suppressor and distributes engine compartment cooling air 64 and ambient air 66 into the plenum/shroud assembly as indicated by arrows 67 and 68. Plenum/shroud assembly 37 includes an annular barrier 69 which is disposed within a fairing 70 and which serves to return a portion of the engine cooling and ambient air through hollow guide vanes 15 both longitudinally and transversely as indicated by arrows 71 and 72, respectively, into plenum 36 in centrifugal blower 25 and against turbine blades 21. The engine exhaust gases, indicated at 73, flow between and past inlet guide vanes 15 directly against hollow turbine blades 21, providing the turbine motive power and self-contained blade cooling.

Some of the inlet guide vanes 15 and radial vanes 39 provide structural support for the interior components of the suppressor and are shown at 75 and 76, respectively. Thermal expansion between vanes 15 which preferably are made of steel and outer vane portions 77 which preferably are made of aluminum is provided for by a slip joint 78. Radial vanes 39, as shown in cross section in FIGS. 1 and 4, are hollow and have internal passages as indicated at 79-82 which also distribute a mix of exhaust gas and cooling air to adjacent spaces and to the atmosphere aft of the suppressor as indicated by the various flow arrows. The turbine engine is contained in a compartment, now shown, upstream of streamlined body 17 which is cooled by gases pumped by tip fan of turbine compressor 22. Support duct 13 terminates in a plurality of support vanes which provide passages for both direct cooling of centerbody 17 and plume cooling at the vane exit. Recirculation of cooling air in the regions of support vanes 15 is provided as indicated by arrows 84-88. Circulation of cooling air is also augmented through vanes 15 and plenum 36 by centrifugal blower 25 as indicated by arrows 89, with the centrifugal blower also inducing circulation of the cooling air through turbine blades 21. The latter circulation acts as a supercharger to offset the pressure drop of cooling air through small holes in the turbine blades as indicated at 90.

The present invention thus provides a self-contained infrared radiation suppressor wherein exhaust gases which drive a turbine fan and blower effectively mix engine cooling air and ambient air with the exhaust gases. This combination and cooperation of components eliminates the need to derive power from other aircraft power systems which, if required, would increase the size of the power systems as well as reduce the overall efficiency of the aircraft plant. The self-contained lubrication system also represents a savings in components and in maintenance in that it may be replenished without removal simply by removing the cover in the central portion of the aft surface of the suppressor. The turbine and radiation suppressor components also are readily severable from the aircraft structure, contain hollow fans which both reduce weight and improve circulation efficiency of cooling air, and represent a substantial savings in cost since an entire suppressor unit or any of its individual assemblies may be removed and replaced by relatively simple procedures. It is noted that cooling air vane 22 provides the large quantity of cooling air required both for operating conditions which entail a high velocity of exhaust gases as well as those conditions which exists at low turbine operating speeds. Cooling air vane 22 also is required for hovering when the suppressor is used on a helicopter.

Obviously, many modifications and variations of the present invention are possible in the light of the foregoing teachings.

What is claimed is:

1. An exhaust suppressor for a gas turbine or other engine having inner and outer exhaust ducts comprising:
    a duct and vane assembly for supporting said suppressor and initially distributing hot exhaust gases;
    a plenum and shroud assembly for mixing hot exhaust gases with cooling air;
    a turbine and vane assembly for powering the operative components of said suppressor,
        said duct and vane assembly coupled to the periphery of said outer exhaust duct and including hollow upstream vanes transverse to and initially intercepting hot engine exhaust gases,
        said outer exhaust duct providing for discharge of engine compartment cooling air, and said inner exhaust duct providing for discharge of hot exhaust gases,
        said plenum and shroud assembly coupled to and surrounding said duct and vane assembly and including hollow shielding vanes adapted to mix and distribute hot exhaust gases and cooling air, and shroud means retaining and circulating cooling air to and through the vanes of said assembly,
        said turbine and vane assembly positioned within and supported by said plenum and shroud assembly and including a centrally disposed exhaust turbine having turbine blades deployed in the path of engine exhaust gases downstream of said vanes in said duct and vane assembly,
        said shielding vanes angled relative to the central axis of said suppressor so as to hide all components forward thereof; and
    a cover secured to said plenum and shroud assembly at the aft end thereof for hiding said turbine from external view aft of said suppressor.

2. The suppressor as defined in claim 1 and further including a centerbody upstream of said exhaust turbine and supported by at least some of said vanes of said duct and vane assembly;
    a plenum in said centerbody and said non-supporting vanes of said duct and vane assembly providing passages communicating between said centerbody plenum and said plenum and shroud assembly, said non-supporting vanes open at their downstream extremities to admit cooling air from said plenum and shroud assembly into said turbine and vane assembly thereby providing mixing of cooing air with hot exhaust gases in said last mentioned assembly.

3. The suppressor as defined in claim 2 wherein said exhaust turbine includes turbine vanes radially disposed with respect to and driven by said turbine blades, said turbine vanes deployed in the path of engine compartment cooling air and ambient air entering said plenum and shroud assembly outboard of said outer exhaust duct, said turbine vanes propelling cooling air and ambient air into said plenum and shroud assembly.

4. The suppressor as defined in claim 3 wherein said exhaust turbine blades are hollow and further including a centrifugal blower in said exhaust turbine adjacent the hub thereof and communicating with said centerbody plenum for distributing cooling air to said exhaust turbine blades and to interior portions of said shielding vanes.

5. The suppressor as defined in claim 4 wherein said exhaust turbine is disposed in a central void radially inward of said shielding vanes and is mounted on bearings supported by selected shielding vanes, said exhaust further including a self-contained lubricating system and means for cooling said system by air circulating through said shielding vanes the circulation of which is augmented by said centrifugal blower.

6. The suppressor as defined in claim 5 whherein said shielding vanes are arcuate and include central, foward and aft compartments communicating with the interior thereof and adapted to direct cooling air along the surfaces thereof and out the extremities and the center thereof to provide film cooling of such surfaces.

* * * * *